(12) United States Patent
Suzuki et al.

(10) Patent No.: US 7,934,744 B2
(45) Date of Patent: May 3, 2011

(54) SADDLE-RIDE TYPE VEHICLE

(75) Inventors: Kazuhiro Suzuki, Saitama (JP); Yuki Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/337,921

(22) Filed: Dec. 18, 2008

(65) Prior Publication Data
US 2009/0167002 A1 Jul. 2, 2009

(30) Foreign Application Priority Data

Dec. 27, 2007 (JP) ................................. 2007-338061
Dec. 27, 2007 (JP) ................................. 2007-338109

(51) Int. Cl.
B60R 21/20 (2011.01)
B60R 21/33 (2006.01)

(52) U.S. Cl. ....... 280/728.2; 280/735; 280/63; 280/798; 180/219

(58) Field of Classification Search ............... 280/728.2, 280/735, 63, 798, 730.1; 180/218, 219, 223
See application file for complete search history.

(56) References Cited

U.S. PATENT DOCUMENTS

| | | | | |
|---|---|---|---|---|
| 5,577,768 A * | 11/1996 | Taguchi et al. | ............... | 280/735 |
| 5,582,423 A * | 12/1996 | Rion et al. | ............... | 280/728.2 |
| 5,887,891 A * | 3/1999 | Taquchi et al. | ............ | 280/728.2 |
| 6,752,415 B2 * | 6/2004 | Nelson et al. | ............ | 280/728.2 |
| 7,232,014 B2 * | 6/2007 | Nakaie | ............ | 188/71.1 |
| 7,740,272 B2 * | 6/2010 | Goto et al. | ............ | 280/735 |
| 2001/0022248 A1 * | 9/2001 | Mori et al. | ............ | 180/219 |
| 2003/0067143 A1 * | 4/2003 | Nelson et al. | ............ | 280/728.2 |
| 2005/0023803 A1 | 2/2005 | Kuroe et al. | | |
| 2006/0055155 A1 * | 3/2006 | Frisch et al. | ............ | 280/728.2 |
| 2007/0057489 A1 * | 3/2007 | Horiuchi et al. | ............ | 280/730.1 |
| 2007/0063491 A1 * | 3/2007 | Horiuchi et al. | ............ | 280/728.2 |
| 2007/0085306 A1 * | 4/2007 | Miyata | ............ | 280/728.2 |
| 2008/0169148 A1 * | 7/2008 | Beiber Hoeve et al. | ...... | 180/219 |
| 2009/0167001 A1 * | 7/2009 | Suzuki et al. | ............ | 280/728.2 |
| 2009/0250910 A1 * | 10/2009 | Tsujimoto | ............ | 280/728.2 |
| 2010/0270778 A1 * | 10/2010 | Hanafusa et al. | ............ | 280/728.2 |

FOREIGN PATENT DOCUMENTS

| | | |
|---|---|---|
| JP | 2002-137779 A | 5/2002 |
| JP | 2004-338658 | 12/2004 |
| JP | 2005-153613 A | 6/2005 |
| JP | 2007-69785 A | 3/2007 |

* cited by examiner

*Primary Examiner* — Eric Culbreth
*Assistant Examiner* — Karen A Beck
(74) *Attorney, Agent, or Firm* — Birch, Stewart, Kolasch & Birch, LLP

(57) ABSTRACT

A technique of enhancing the flexibility of arranging members provided in the vicinity of a steering handlebar in a saddle-ride type vehicle equipped with an airbag module. A straddle-ride type vehicle includes a head pipe and a seat which is provided to the rear of the head pipe with a straddle space defined between the steering handlebar and the seat and an airbag module provided forward of the seat. The airbag module is disposed to the rear of the head pipe to vertically overlap the head pipe in the height-direction thereof and to partially face the straddle space.

18 Claims, 11 Drawing Sheets

SADDLE-RIDE TYPE VEHICLE

CROSS-REFERENCE TO RELATED APPLICATIONS

The present application claims priority under 35 USC 119 to Japanese Patent Application No. 2007-338061 and Japanese Patent Application No. 2007-338109 both filed on Nov. 30, 2007 the entire contents of which are hereby incorporated by reference.

BACKGROUND OF THE INVENTION

1. Field of the Invention

The present invention relates to a saddle-ride type vehicle equipped with an airbag module at the front portion thereof.

2. Description of Background Art

A motorcycle equipped with an airbag module that expands upon crash is known that is positioned between a steering handlebar steered by an occupant and an occupant seat on which the occupant sits. See, for example, Japanese Patent Laid-open No. 2005-153613 (FIG. 5).

In FIG. 5 of Japanese Patent Laid-open No. 2005-153613, an airbag device 21 is provided at the front portion of a motorcycle. This airbag module 21 is disposed at a generally central portion of the handlebar 3 (hereinafter, called "the steering handlebar 3") via an airbag attachment bracket 25.

For the motorcycle, instruments and the like are arranged in the vicinity of the steering handlebar 3. If the airbag module 21 is disposed close to the center of the steering handlebar 3, flexibility in arranging members such as instruments and the like may probably be reduced.

An airbag module arrangement structure is required that can improve the flexibility with respect to arranging members such as instruments and the like.

A motorcycle equipped with an airbag module expanding upon crash or the like is known wherein a pair of left and right upper frames extend rearwardly from a head pipe. See, for example, Japanese Patent Laid-open No. 2007-69785 (FIG. 9).

In FIG. 9 of Japanese Patent Laid-open No. 2007-69785, upper tubes 2L, 2R (hereinafter, called "the upper frames 2L, 2R") are provided to extend rearwardly from a head pipe 3. An airbag module 20 is disposed to straddle the upper frames 2L, 2R and an airbag ECU 35 (hereinafter, called "the airbag control unit 35") is disposed on the right side of the airbag module 20. Here, the airbag device includes the airbag module 20 and the airbag control unit 35 as main constituent elements.

Members such as instruments and the like are disposed on the front portion of a motorcycle. However, the arrangement of the airbag device on the front portion of the vehicle undesirably causes restrictions on the arrangement of the members such as the instruments and the like. A technique is desired to reduce the space occupied by the airbag device as much as possible.

SUMMARY AND OBJECTS OF THE INVENTION

It is an object of an embodiment of the present invention to provide a technique of enhancing the flexibility of arranging members provided in the vicinity a steering handlebar in a saddle-ride type vehicle equipped with an airbag module.

According to an embodiment of the present invention, in a straddle-ride type vehicle including: a head pipe provided at a leading end of a body frame to turnably support a steering handlebar steered by an occupant, an occupant seat is provided rearward of the head pipe and adapted to allow the occupant to sit thereon. A straddle space is defined between the steering handlebar and the occupant seat that is straddled by the occupant. An airbag module is provided forward of the occupant seat for storing an airbag therein. The airbag module is disposed rearward of the head pipe to partially face the straddle space and at least a portion of the airbag module is disposed within a vertical width of the head pipe as viewed from the side.

According to an embodiment of the present invention, the airbag module is disposed below the steering handlebar.

According to an embodiment of the present invention, a front portion of the body frame is provided with a cowl for covering a vehicle body and a rear surface of the airbag module protrudes outwardly from an outer surface of the cowl.

According to an embodiment of the present invention, the body frame includes a pair of left and right upper frames extending downwardly and rearwardly from an upper portion of the head pipe and a pair of left and right lower frames extending downwardly and rearwardly from a lower portion of the head pipe. Both left and right lateral surfaces of the airbag module with respect to an anteroposterior center thereof are disposed externally of a left-right external width of the upper frame and internally of a left-right external width of the lower frame.

According to an embodiment of the present invention, the airbag module is formed boxlike and left and right end edges provided on the rear surface of the airbag module are chamfered.

According to an embodiment of the present invention, the airbag module is formed boxlike and a lower end edge provided on the rear surface of the airbag module are chamfered.

According to an embodiment of the present invention, the airbag module is disposed in an unused space rearward of the head pipe to partially face the straddle space. In addition, the airbag module is at least partially disposed within the vertical width of the head pipe as viewed from the side. This makes it difficult to affect the layout of members arranged in the vicinity of the steering handlebar. By reducing the influence on the layout of the members arranged in the vicinity of the steering handlebar, the flexibility of arranging the members in the vicinity of the steering handlebar can be enhanced.

According to an embodiment of the present invention, the airbag module is disposed below the steering handlebar. Because of this, the flexibility of designing the steering handlebar and the vicinity thereof can further be enhanced.

According to an embodiment of the present invention, since the rear surface of the airbag module protrudes from the rear surface of the cowl, the space occupied by the airbag module inside the cowl can be reduced. Because of this, the flexibility of layout of the other members inside the cowl can be enhanced.

According to an embodiment of the present invention, both the left and right lateral surfaces of the airbag module with respect to the anteroposterior center thereof are disposed externally of the upper frame. Thus, the airbag module can ensure a sufficient widthwise-length. Because of this, the airbag can smoothly be deployed from side to side.

In addition, since both the left and right lateral surfaces of the airbag module with respect to the anteroposterior center thereof are disposed internally of the left-right external width of the lower frame, enlargement of the vehicle-width can be avoided. That is to say, setting the width of the airbag module at an optimum width can achieve a balance between the sufficient deployment performance of the airbag and compactification of the airbag module.

According to an embodiment of the present invention, since the airbag module is formed boxlike and the left and right end edges of the airbag module rear surface are chamfered, the straddle space can be enlarged. In addition, since the straddle space can sufficiently largely be ensured, mounting and dismounting on and from the vehicle can further easily be executed and additionally occupant comfort during mounting on the vehicle can be enhanced.

According to an embodiment of the present invention, since the airbag module is formed boxlike and the lower end edge provided at the rear surface of the airbag module is chamfered, the straddle space can further largely be ensured. Thus, a space is formed for sufficiently ensuring the straddle space for further enhancing the ease of mounting and dismounting and the occupant comfort during mounting and dismounting on and from the vehicle.

It is an object of an embodiment of the present invention to provide a technique of arranging an airbag device in a compact manner and of enhancing the flexibility of the arranging members in the vicinity of an airbag module.

According to an embodiment of the present invention, a straddle-ride type vehicle includes a head pipe turnably supporting a steering handlebar with an airbag module storing an airbag therein and an airbag control unit for controlling deployment of the airbag. The airbag module is disposed rearward of the head pipe, and the airbag control unit is disposed vehicle-widthwise laterally of the head pipe and disposed to at least partially overlap the airbag module if the vehicle is viewed from the rear.

According to an embodiment of the present invention, the head pipe is slantwise arranged so that a lower end is located forward of an upper end, and the airbag control unit is disposed rearward of a front end of the lower end portion of the head pipe if the vehicle is viewed from the side.

According to an embodiment of the present invention, a space is provided rearward of the airbag control unit to permit movement of the airbag control unit.

According to an embodiment of the present invention, the airbag module and the airbag control unit are arranged to be offset in a height-direction.

According to an embodiment of the present invention, a central axis of the airbag module and a central axis of the airbag control unit are arranged along an axial direction of the head pipe if the vehicle is viewed from the side.

According to an embodiment of the present invention, a key cylinder used to turn on or off power supply to the vehicle is disposed on one side of the sides of the head pipe and the airbag control unit is disposed on the other side thereof with the head pipe put therebetween.

According to an embodiment of the present invention, since the airbag control unit is disposed to at least partially overlap the airbag module if the vehicle is viewed from the rear, the widthwise-length of the airbag device can be suppressed. Because of this, the airbag device can be arranged in a compact manner. This provides room for a space for arranging the members. Thus, the flexibility of arranging members in the vicinity of the airbag device can be enhanced.

According to an embodiment of the present invention, the head pipe is slantwise arranged so that a lower end is located forward of an upper end, and the airbag control unit is disposed rearward of a front end of the lower end portion of the head pipe if the vehicle is viewed from the side. Thus, when the vehicle is subjected to an external force from the front, the front end of the lower end portion of the head pipe is first subjected to the external force. Since the front end of the lower end portion of the head pipe is subjected to the external force, it is possible to make it difficult for the external force to be transmitted to the airbag control unit.

According to an embodiment of the present invention, the space is provided rearward of the airbag control unit to permit movement of the airbag control unit. Thus, even if the airbag control unit is subjected to the external force and moved rearward, it is accommodated in the space, whereby the airbag control unit can be made unsusceptible to the influence of the external force.

According to an embodiment of the present invention, the airbag module and the airbag control unit are arranged to be offset in a height-direction. Thus, even if the airbag control unit is subjected to the external force from the front and moved rearward, it is possible to make it difficult for the airbag control unit to interfere with the airbag module.

According to an embodiment of the present invention, the central axis of the airbag module and the central axis of the airbag control unit are arranged along an axial direction of the head pipe if the vehicle is viewed from the side. Since the airbag module and the airbag control unit are provided to be aligned with the axial direction of the head pipe, the structure in the vicinity of the head pipe can be made simple and compact.

According to an embodiment of the present invention, since the key cylinder used to turn on or off power supply to the vehicle is disposed on one side of the sides of the head pipe and the airbag control unit is disposed on the other side thereof with the head pipe put therebetween, the space on the side opposite to the key cylinder can effectively be utilized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
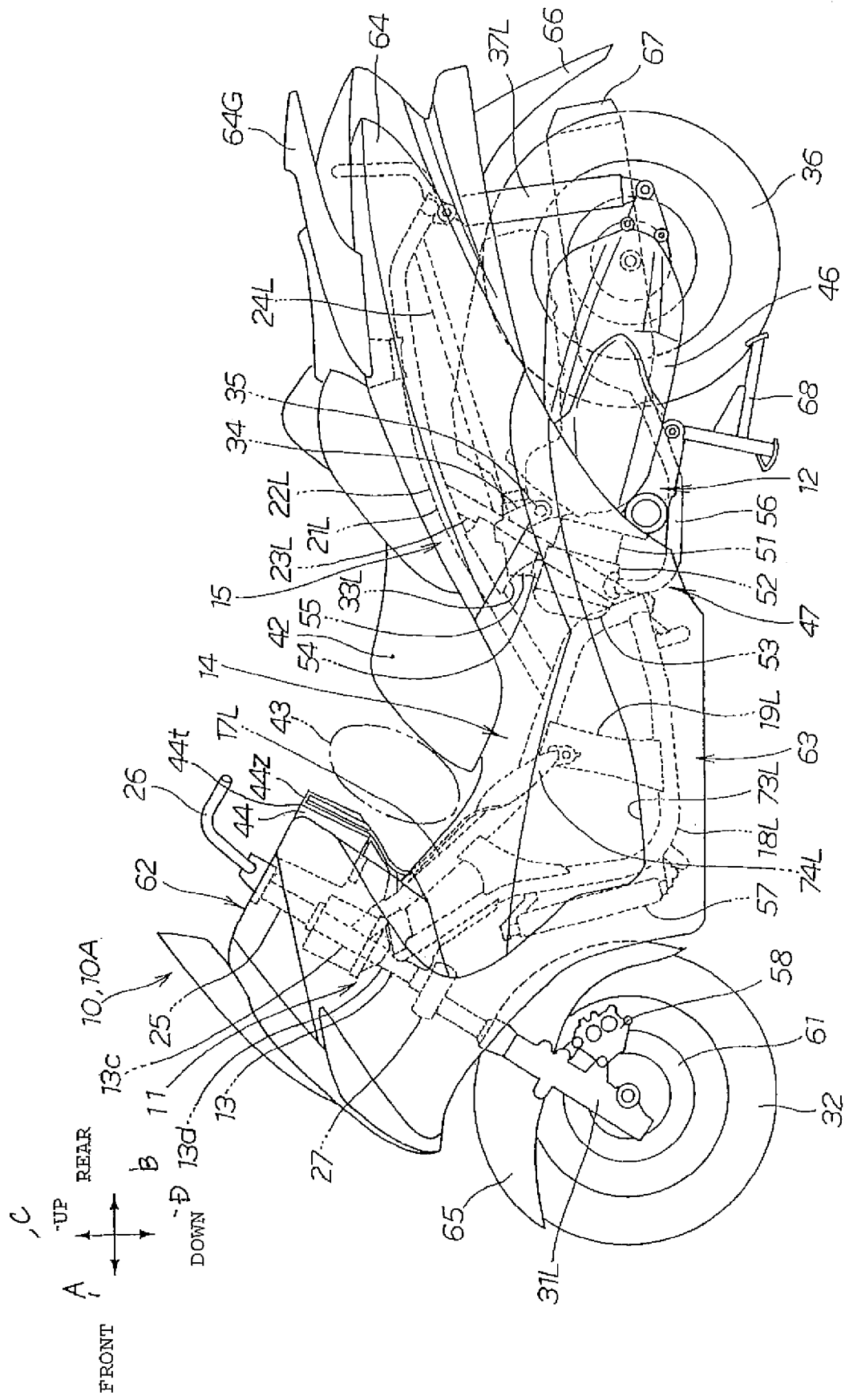
FIG. 1 is a left lateral view of a straddle-ride type vehicle according to the present invention.

The best mode for carrying out the present invention will hereinafter be described with reference to the accompanying drawings. In the drawings, "the front," "the back or rear," "the left," "the right," "the upside" and "the downside" each indicate the direction a rider looks. It is to be noted that the drawings shall be viewed based on the orientation of reference numerals or symbols.

FIG. 1 is a left lateral view of a saddle-ride type vehicle according to the present invention. A scooter-type motorcycle 10A as one type of saddle-ride type vehicles includes a body frame 11 and a power unit 12 suspended by the body frame 11 and serving as a drive source.

The body frame 11 is composed of a head pipe 13, a main frame 14 joined at a leading end to the head pipe 13 and extending downwardly and rearwardly from the head pipe 13, and a rear frame 15 joined to the main frame 14 and extending rearwardly therefrom.

The main frame 14 is a member including, as constituent members, a pair of left and right upper frames 17L, 17R (only reference numeral 17L on the front side is shown and this applies to the following) extending downwardly and rearwardly from an upper portion 13c of the head pipe 13; and a pair of left and right lower frames 18L, 18R (only reference numeral 18L on the front side is shown and this applies to the following) extending downwardly and rearwardly from a lower portion 13d of the head pipe 13. In addition, connecting members 19L and 19R (only reference numeral 19L on the front side is shown and this applies to the following) are spanned between the upper frame 17L and the lower frame 18L and between the upper frame 17R and the lower frame 18R, respectively, to increase the rigidity of the main frame 14.

The rear frame 15 includes, as constituent members, seat rails 21L, 21R (only reference numeral 21L on the front side is shown and this applies to the following), middle frames 23L, 23R (only reference numerals 23L on the front side is shown and this applies to the following), and rail stays 24L, 24R (only reference numeral 24L on the front side is shown and this applies to the following). The seat rails 21L and 21R extend obliquely rearwardly and upwardly from the respective rear portions of the upper frames 17L and 17R, respectively. The middle frames 23L and 23R connect respective intermediate points 22L and 22R (only reference numeral 22L on the front side is shown and this applies to the following) of the seat rails 21L and 21R with the respective rear ends of the upper frames 17L and 17R, respectively. The rail stays 24L and 24R are spanned between the upper portion of the middle frames 23L and the rear portion of the seat rail 21L and between the upper portion of the middle frame 23R and the rear portion of the seat rail 21R, respectively.

A steering shaft 25 is provided on the head pipe 13 constituting a leading end portion of the body frame 11. The steering handlebar 26 steered by the occupant is turnably supported by the upper end of the steering shaft 25. Front forks 31L, 31R (only reference numeral 31L on the front side is shown and this applies to the following) are attached to the lower end of the steering shaft 25 via a bottom bridge 27 formed generally triangular as viewed from above. A front wheel 32 is rotatably mounted between the lower ends of the front forks 31L, 31R.

Pivot plates 33L and 33R (only reference numeral 33L on the front side is shown and this applies to the following) are spanned between the seat rail 21L and the middle frame 23L and between the seat rail 21R and the middle frame 23R, respectively. The pivot plates 33L, 33R are provided with respective link members 34 extending downward therefrom. The link members 34 are provided with a support shaft 35. The power unit 12 also serving as a rear swing arm is vertically swingably mounted by the support shaft 35. A rear wheel 36 as a drive wheel is rotatably mounted to the rear end portion of the power unit 12. Rear shock absorbers 37L and 37R (reference numeral 37L on the front side is shown and this applies to the following) for absorbing a shock from the road surface are spanned between the power unit 12 and the seat rail 21L and between the power unit 12 and the seat rail 21R, respectively.

An occupant seat 42 is mounted on the upper surfaces of the seat rails 21L, 21R.

The occupant seat 42 is provided rearwardly of the head pipe 13. A straddle space 43 straddled by the occupant is formed between the steering handlebar 26 turnably supported by the head pipe 13 and the occupant seat 42 on which the occupant sits. An airbag module 44 housing an airbag therein is installed forward of the occupant seat 42.

The airbag module 44 is disposed rearwardly of the head pipe 13 so as to partially overlap the head pipe 13 if the head pipe 13 is viewed from the front. In other words, at least a portion of the airbag module 44 is disposed within the vertical width H of the head pipe 13 as viewed from the side and the airbag module 44 is disposed to vertically overlap the head pipe 13 in the height-direction of the head pipe 13 as viewed from the front. That is to say, since the airbag module 44 is disposed to partially overlap the head pipe 13, the height of the upper end surface 44t of the airbag module 44 can be suppressed to a low level. If the height of the upper end surface 44t can be suppressed to a low level, a space can be ensured above the airbag module 44. As a result, the flexibility of member-layout in the vicinity of the steering handlebar 26 can be enhanced in the height-direction.

In the present embodiment, the airbag module 44 is disposed below the steering handlebar 26. Therefore, the flexibility of designing the steering handlebar 26 and the periphery thereof can be enhanced. More specifically, the flexibility is enhanced with respect to the arrangement of the steering handlebar 26 and members in the vicinity of the steering handlebar 26.

In addition, a portion 44z of the airbag module 44 is provided to face the straddle space 43.

The power unit 12 is composed of a transmission unit 46 incorporating a belt-type transmission and an engine 47 extending forwardly from the front end of the transmission unit 46.

The engine 47 is a multi-cylinder water-cooled 4-cycle engine in which a cylinder block 51, a cylinder head 52 and a cylinder head cover 53 are mounted to the transmission unit 46 in this order. An air cleaner unit 55 is connected to the upper surface of the cylinder head 52 via an intake pipe 54. An exhaust pipe 56 is joined to the lower surface of the cylinder head 52.

In FIG. 1, a radiator unit 57 is provided for cooling the engine 47 together with a front disk brake unit 58, a front brake disk 61, a front cowl 62 for covering the vehicle from the front, a main cowl 63 for covering the side of the vehicle, a rear cowl 64, a grab rail 64G, a front fender 65, a rear fender 66, a muffler 67 coupled to the rear end of the exhaust pipe 56, and a main stand 68.

Figure 2:
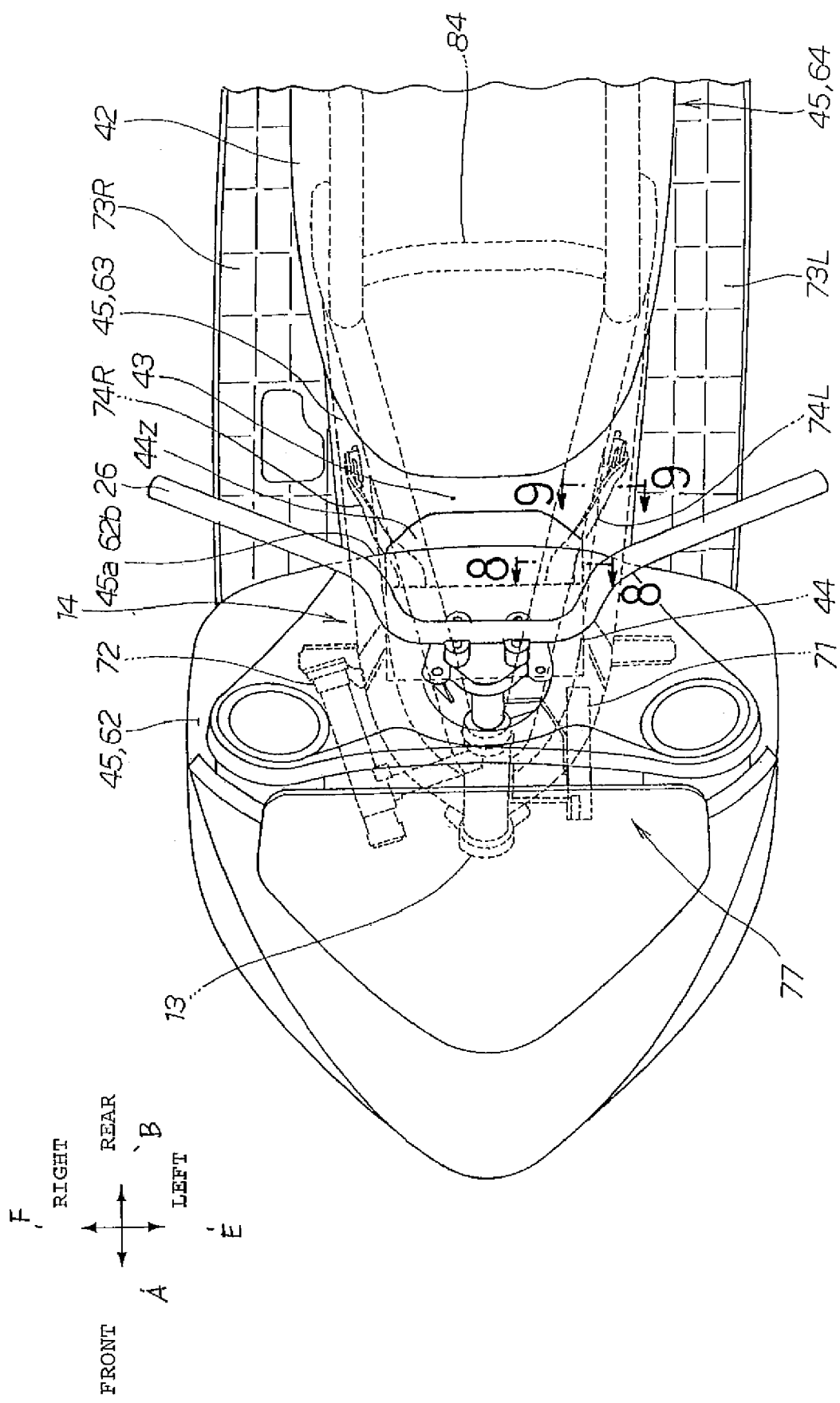
FIG. 2 is a plan view of an essential portion of the straddle-ride type vehicle according to the present invention.

FIG. 2 is a plan view of an essential portion of the straddle-ride type vehicle according to the present invention.

The airbag module 44 mentioned above is disposed rearwardly of the head pipe 13. An airbag control unit 71 for controlling the deployment of the airbag stored in the airbag module 44 is disposed on the left side of the head pipe 13. A key cylinder 72 is disposed on the right side of the head pipe 13. The key cylinder 72 is adapted to receive a key inserted thereinto when the power of the vehicle is turned on or off.

The head pipe 13, the airbag module 44 and the airbag control unit 71 constituting the front portion of the body frame 11 are covered by the front cowl 62 as a constituent element of the cowl 45. A portion 44z of the airbag module 44 is provided to face the straddle space 43 from the rear surface 62b of the front cowl 62 as the outer surface 45a of the cowl 45. The main cowl 63 as a constituent element of the cowl 45 is provided below the straddle space 43 to cover the main frame 14. The occupant seat 42 is disposed rearwardly of the airbag module 44, Step floors 73L and 73R are respectively provided at left and right side lower portions of the occupant seat 42. The step floors 73L, 73R each have a generally horizontal surface and serve as a footrest on which the occupant's foot is placed. The rear cowl 64 covers from the left and right sides of the passenger seat 42 to the rear portion of the vehicle. That is to say, the cowl 45 is a member that covers the body frame 11 and constitutes the external appearance surface of the vehicle. In addition, the cowl 45 is composed of the front cowl 62, the main cowl 63 and the rear cowl 64 in this order from the front to the rear of the vehicle.

Left and right bag-mooring members numerals 74L and 74R (only reference numeral 74L on the front side is shown and this applies to the following) are provided, respectively, for retaining the airbag at respective predetermined positions when the airbag is expanded and deployed.

In FIG. 2, a cross member 84 spans between the lower frames 18L, 18R.

A description is hereinafter given of the arrangement among the airbag module 44 constituting the airbag device 77, the main frame 14, the bag-mooring members 74L, 74R connecting between the airbag module 44, and the bag control unit 71 for controlling the deployment of the airbag with reference to FIGS. 3 to 5.

Figure 3:
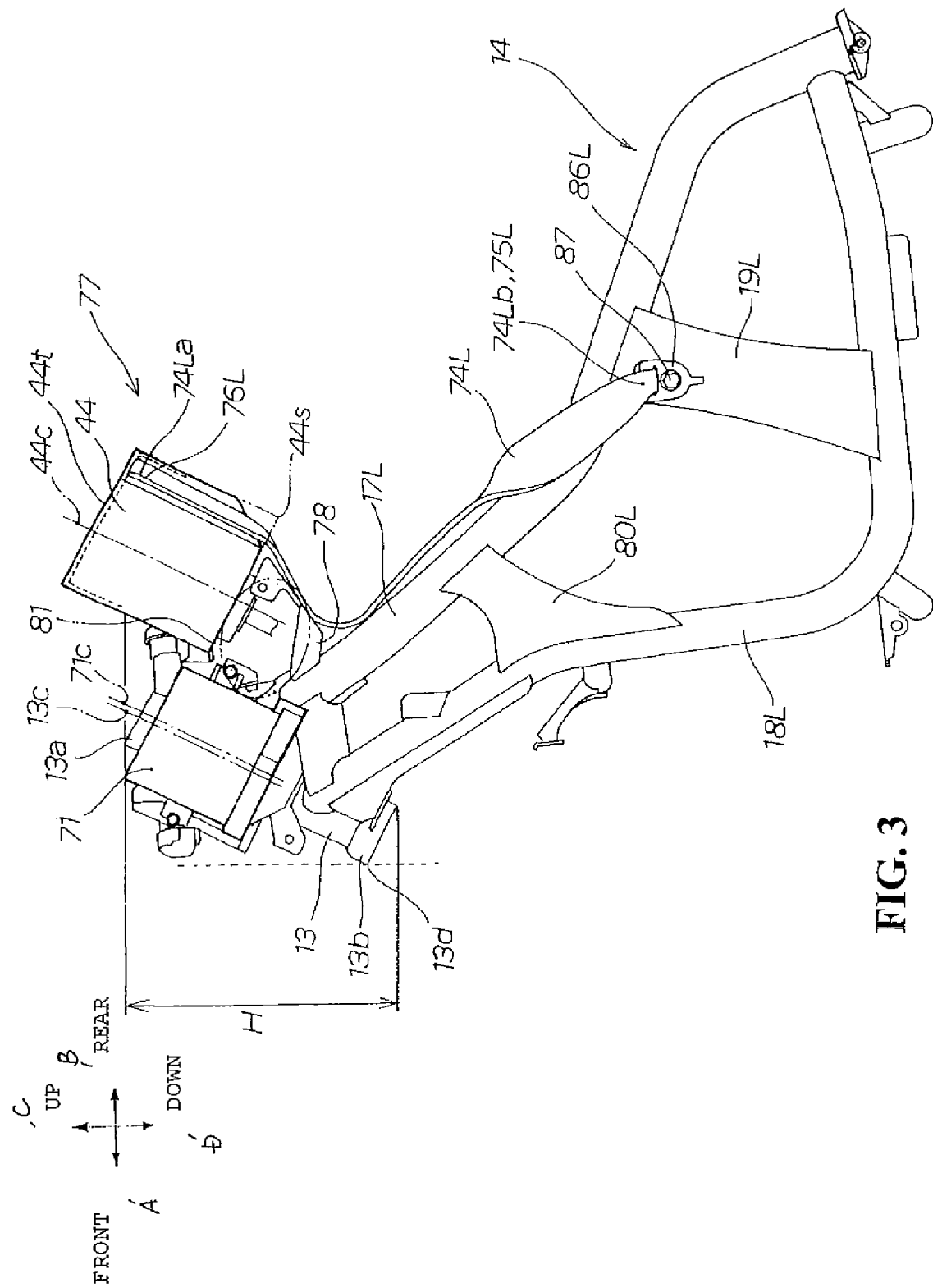
FIG. 3 is a lateral view of a main frame mounted thereon with an airbag device according to the present invention.

FIG. 3 is a lateral view of the main frame on which the airbag device is mounted according to the present invention. A bracket 78 is provided to extend from a generally upper portion of the upper frames 17L, 17R. The airbag module 44 is mounted to the bracket 78. A lower end edge 44s of the airbag module 44 is provided.

Respective one ends 74La, 74Ra (only reference numeral 74La on the front side is shown and this applies to the following) of the bag-mooring members 74L, 74R are secured to the airbag module 44. The respective other ends 74Lb and 74Rb (only reference numeral 74Lb on the front side is shown and this applies to the following) of the bag-mooring members 74L, 74R are secured to the connecting members 19L and 19R, respectively. The bag-mooring members 74L, 74R are detailed later. As illustrated in FIG. 3, connecting stays 80L, 80R (only reference numeral 80L on the front side is shown and this applies to the following) are provided wherein one of which connects between the upper frame 17L and the lower frame 18L and the other of which connects between the upper frame 17R and the lower frame 18R.

Figure 4:
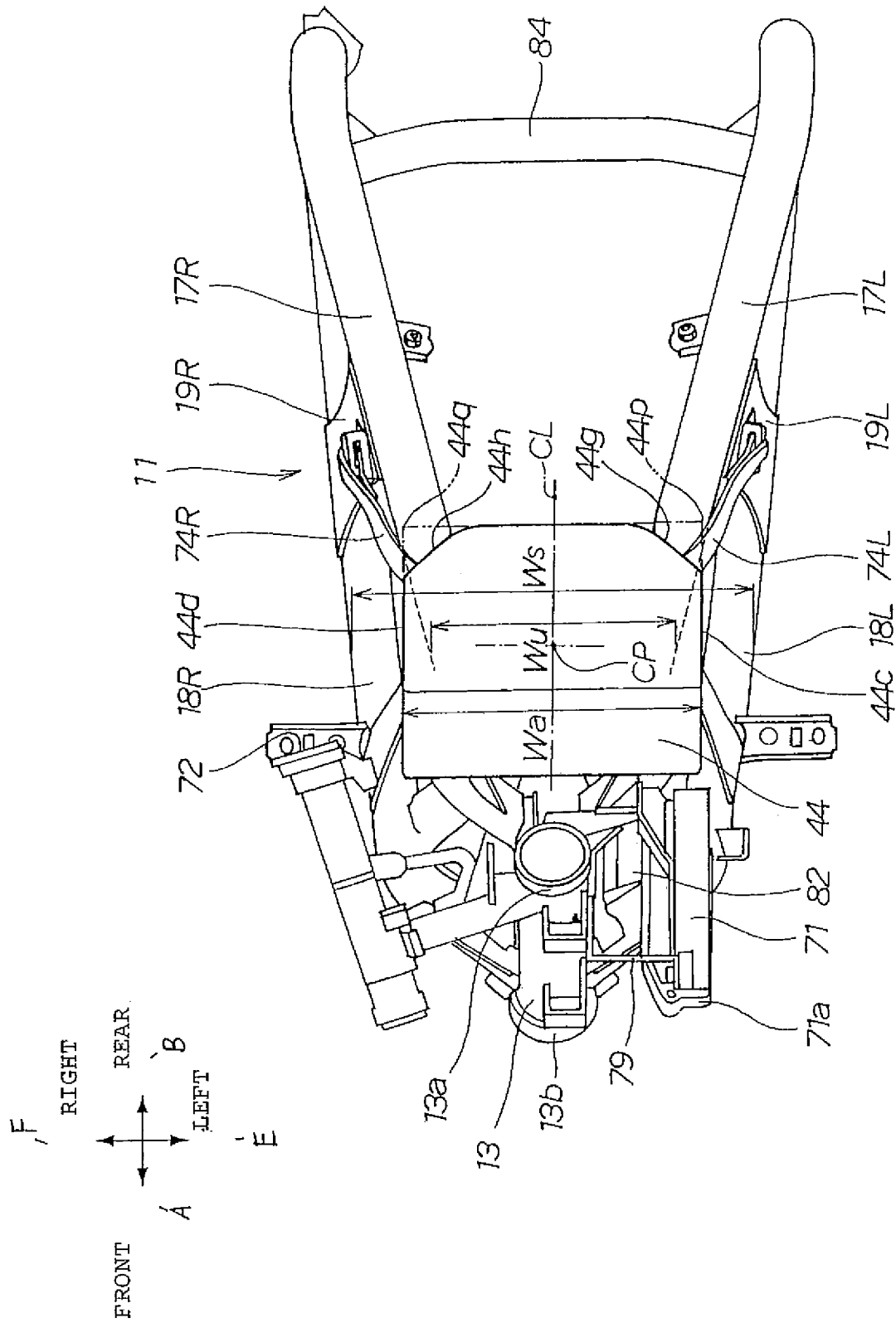
FIG. 4 is a plan view of the main frame mounted thereon with the airbag device according to the present invention.

FIG. 4 is a plan view of the main frame on which the airbag device is mounted according to the present invention. The body frame 11 includes a pair of the left and right upper frames 17L, 17R provided to extend downwardly and rearwardly from the upper portion of the head pipe 13 and a pair of the left and right lower frames 18L, 18R provided to extend downwardly and rearwardly from the lower portion of the head pipe 13. If the body frame 11 is viewed from above, with respect to the anteroposterior center CP, both left and right lateral surfaces 44c, 44d of the airbag module 44 are disposed outside a left-right external width Wu of the upper frames 17L, 17R and inside a left-right external width Ws of the lower frames 18L, 18R. Both the left and right lateral surfaces 44c, 44d of the airbag module 44 is disposed outside the upper frames 17L, 17R; therefore, the airbag module 44 can ensure a sufficient widthwise-length. Because of this, when deployed, the airbag (see reference numeral 85 in FIG. 7 described later) can smoothly be deployed from side to side.

Both the left and right lateral surfaces 44c, 44d of the airbag module 44 are disposed inside the left-right external width Ws of the lower frames 18L, 18R; therefore, enlargement of the vehicle-width can be avoided. That is to say, the length of the external width Wa of the airbag module 44 is set to such an optimum width-length as to provided the relationship of Wu<Wa<Ws. This can achieve a balance between the sufficient deployment performance and compactification of the airbag module 44.

The airbag control unit 71 is disposed vehicle-widthwise laterally of the head pipe 13. More specifically, a stay 79 is provided to extend to the left from the head pipe 13 and the airbag control unit 71 is secured to the stay 79.

The head pipe 13 is slantwise arranged so that a lower end 13b is located forward of an upper end 13a. A front end 71a of the airbag control unit 71 is disposed rearwardly of the lower end 13b or the front end 13d of the head pipe 13. Thus, when the vehicle takes an impact from the front, an impactive force is first transmitted to the lower end 13b of the head pipe 13.

An impactive force is first transmitted to and absorbed by the lower end 13b or the front end 13d of the head pipe 13. This makes it difficult for the impactive force to be transmitted to the airbag control unit 71. If so, the airbag control unit 71 can be protected.

Referring to FIGS. 3 and 4, the airbag module 44 and the airbag control unit 71 are arranged to be offset from each other in the height-direction.

A space 81 is provided to the rear of the airbag control unit 71 to permit the movement of the airbag control unit 71. Because of this, even if the airbag control unit 71 takes an impact to be moved rearward, it can be accommodated in the movement space 81 of the airbag control unit 71. It is possible, therefore, to make the airbag control unit 71 unsusceptible to external force.

If the vehicle is viewed from the side, a central axis 44c of the airbag module 44 and a central axis 71c of the airbag central unit 71 are arranged parallel to the direction of an axis 13c of the head pipe 13. Since the airbag module 44 and the airbag control unit 71 are provided parallel to the direction of the axis 13c of the head pipe 13, a structure in the vicinity of the head pipe 13 can be simplified and made compact.

The pair of left and right bag-mooring members 74L, 74R are joined to the airbag (see reference numeral 85 of FIG. 7 described later) to retain the airbag 85 at a position facing an occupant during expansion and deployment of the airbag 85.

The bag-mooring members 74L and 74R are connected to the main frame 14 via the connecting members 19L and 19R, respectively.

The bag-mooring members 74L, 74R are arranged along the main frame 14. In addition, rear ends 75L and 75R (only reference numeral 75L on the front side is shown) as the respective other ends 74Lb and 74Rb of the bag-mooring members 74L and 74R are respectively connected to the connecting members 19L and 19R via retainers 86L and 86R (only reference numeral 86L on the front side is shown and this applies to the following) and via bolts 87, 87 securing the retainer 86L and 86R.

In addition, the bag-mooring members 74L, 74R may be made by weaving the same resin-fiber yarn as the vehicle seatbelt or it is reasonable to use the same material as that of the airbag 85. The material, structure, sectional shape, etc. of the bag mooring members 74L, 74R may optionally be set as long as they have a predetermined function and strength taking into account a secular change and the like.

In the present embodiment, the respective other ends 74Lb and 74Rb of the bag-mooring members 74L and 74R are connected to the connecting members 19L and 19R, respectively. However, the respective positions of the other ends 74Lb, 74Rb of the bag-mooring members 74L and 74R may be changed depending on the type of vehicle in some cases. In such a case, the respective connecting positions of the other ends 74Lb, 74Rb of the bag-mooring members 74L, 74R to the connecting members 19L, 19R can be changed to any positions. For this reason, an increase in vehicle cost can be suppressed when the airbag device 77 is mounted on a different type of vehicle.

Figure 5:
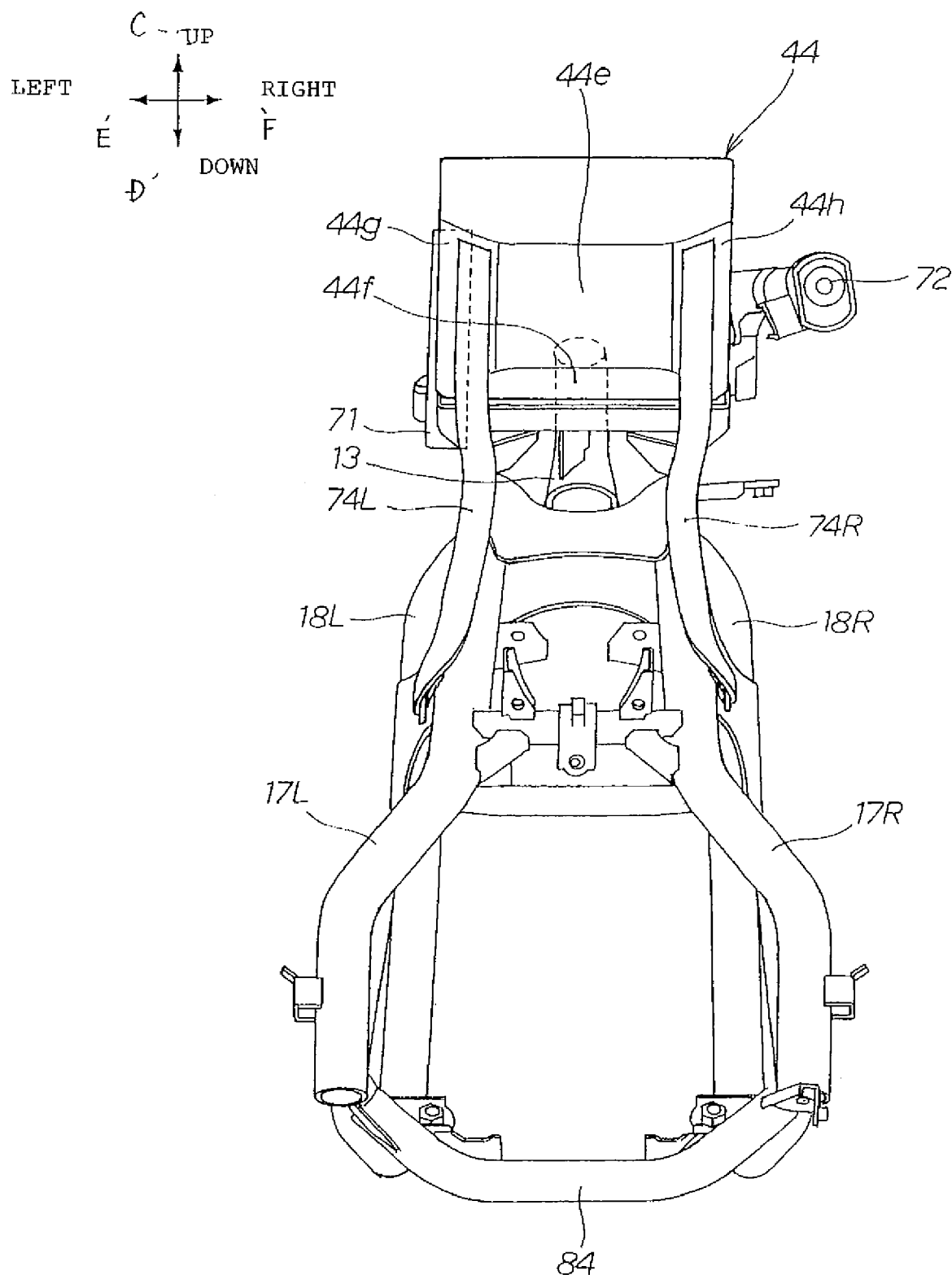
FIG. 5 is a rear view of the main frame mounted thereon with the airbag device according to the present invention.

FIG. 5 is a rear view of the main frame on which the airbag device is mounted according to the present invention. When the vehicle is viewed from the rear, the airbag control unit 71 is disposed to at least partially overlap the airbag module 44.

The airbag module 44 is formed in a boxlike shape. In addition, the lower end edge 44s provided at the rear surface 44e of the airbag module 44 is chamfered by forming a lower edge-chamfered portion 44f thereat. Therefore, the straddle space 43 can be ensured to be enlarged. The straddle space 43 is sufficiently ensured to further enhance occupant mount-dismount and comfort.

With additional reference to FIG. 4, the airbag module 44 is formed in a boxlike shape. In addition, left and right end edges 44p and 44q provided at the rear surface 44e of the airbag module 44 are chamfered by a left edge-chamfered portion 44g and by a right edge-chamfered portion 44h, respectively. Therefore, the straddle space 43 can be enlarged. Since the straddle space 43 is sufficiently ensured, mounting and dismounting on and from the vehicle can further be facilitated and occupant comfort at the time of mounting on the vehicle can be enhanced.

On the side of the head pipe 13, the key cylinder 72 for turning on or off a power supply to the vehicle is disposed on the right side, i.e., on one side. In addition, the airbag control unit 71 is disposed on the left side, i.e., on the other side, with the head pipe 13 put therebetween. Thus, a space (see reference numeral 82 of FIG. 4) on the side opposite to the key cylinder 72 can effectively be utilized.

Figure 6:
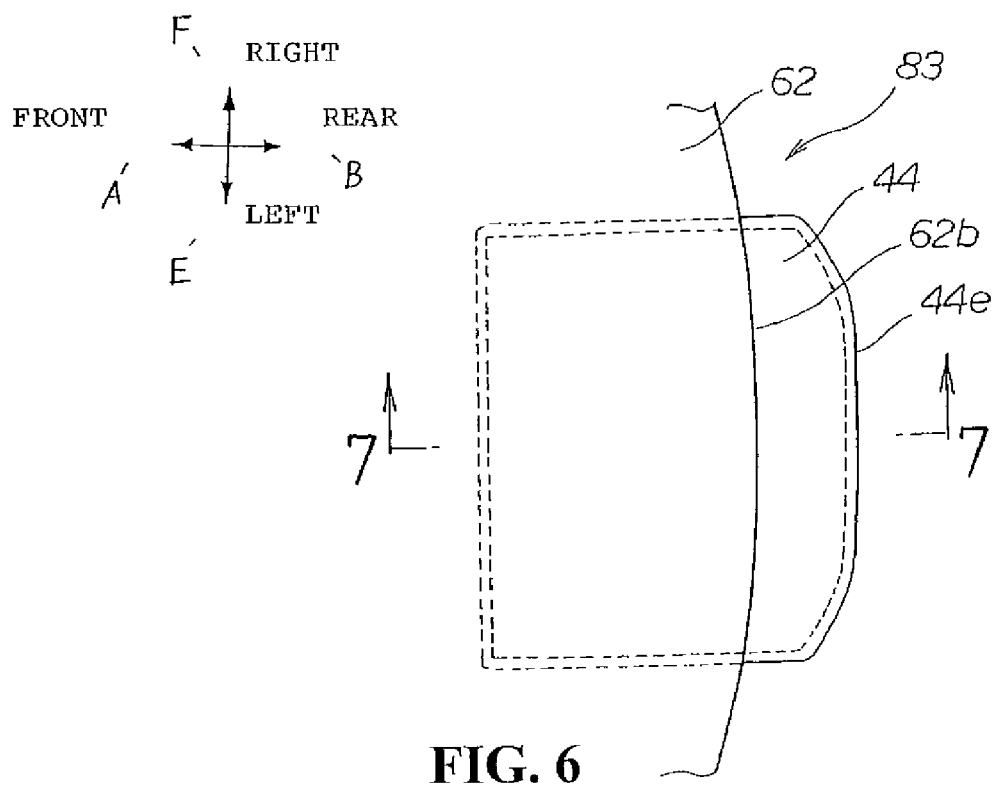
FIG. 6 is a plan view for assistance in explaining the arrangement relationship between an airbag module and a cowl.

FIG. 6 is a plan view for assistance in explaining the arrangement relationship between the airbag module and cowl. The front cowl 62 as a cowl is provided at the front portion 83 of the vehicle. The rear surface 44e of the airbag module 44 protrudes outwardly from the rear surface 62b forming the external surface of the front cowl 62.

The rear surface 44e constituting part of the airbag module 44 protrudes to the rear from the external surface of the cowl 62. Therefore, an occupying space of the airbag module 44 occupying the inside of the front cowl 62 can be reduced. Because of this, the flexibility of the layout of the other members in the front cowl 62 can be enhanced.

Figure 7:
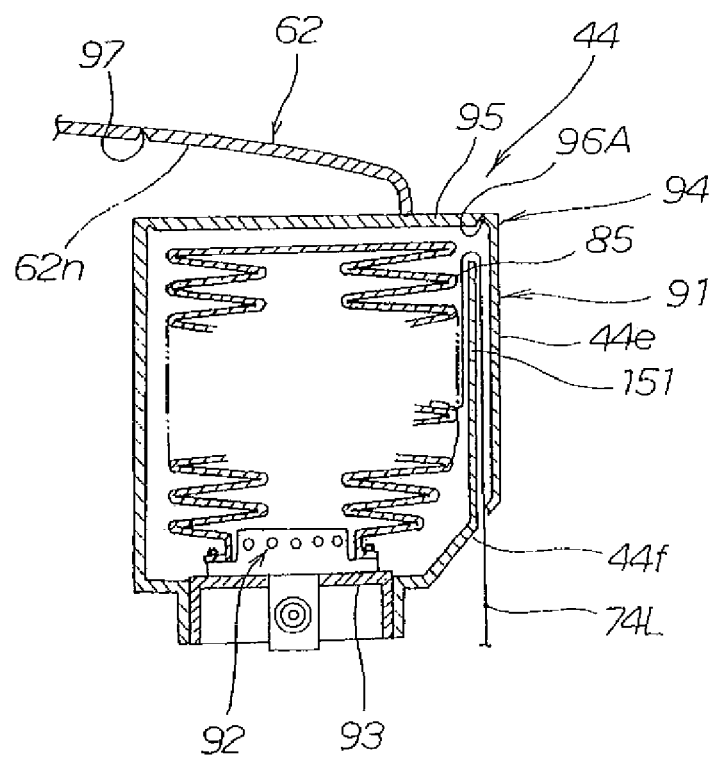
FIG. 7 is a cross-sectional view taken along line 7-7 of FIG. 6.

FIG. 7 is a cross-sectional view taken along line 7-7 of FIG. 6. The airbag module 44 housing the airbag 85 therein includes, as main constituent elements, a container portion 91; the airbag 85 folded and stored in the container portion 91; and an inflator 92 for generating gas used to expand and deploy the airbag 85.

The container portion 91 includes a bottom portion 93; a frame portion 94 including the rear surface 44e rising upward from the bottom portion 93 and left and right lateral surfaces (reference numerals 44c, 44d in FIG. 4) constituting part of the airbag module 44; and a lid portion 95 covering the frame portion 94 from above. A notched portion 96 is formed between the frame portion 94 and the lid portion 95 so as to make it possible to easily open the lid portion 95 from the frame portion 94 when the airbag 85 is expanded and deployed. The notched portion 96 is formed on the lid portion 95 to extend along the frame portion 94. Also a notch 97 is formed on an inside surface 62n of the front cowl 62 so as to enable the expansion-deployment of the airbag 85.

A partition wall 151 is provided between the rear surface 44e and the airbag 85. The bag-mooring members 74L, 74R are partially folded and stored between the partition wall 151 and the rear surface 44.

As illustrated in FIG. 3, the airbag 85 is connected to the main frame 14 by using the pair of left and right bag-mooring members 74L, 74R retaining the airbag 85 at a position facing the occupant. In addition, the bag-mooring members 74L, 74R are disposed along the main frame 14.

The pair of left and right bag-mooring members 74L, 74R are disposed along the main frame 14. Therefore, when the airbag 85 is expanded and deployed, of the bag-mooring members 74L, 74R disposed along the main frame 14, respective front ends 76L, 76R of the bag-mooring members 74L, 74R that serve as connecting portions with the airbag 85 are first lifted. As the expansion and deployment of the airbag 85 proceeds, the bag-mooring members 74L, 74R are lifted from the front ends 76L, 76R of the bag-mooring members 74L, 74R toward the rear ends 75L, 75R. As described above, since the bag-mooring members 74L and 74R are disposed along the upper frames 17L and 17R, respectively, constituting the main frame 14, it is possible for the bag-mooring members 74L, 74R to smoothly guide the airbag 85 in the expanding direction thereof.

Figure 8A:
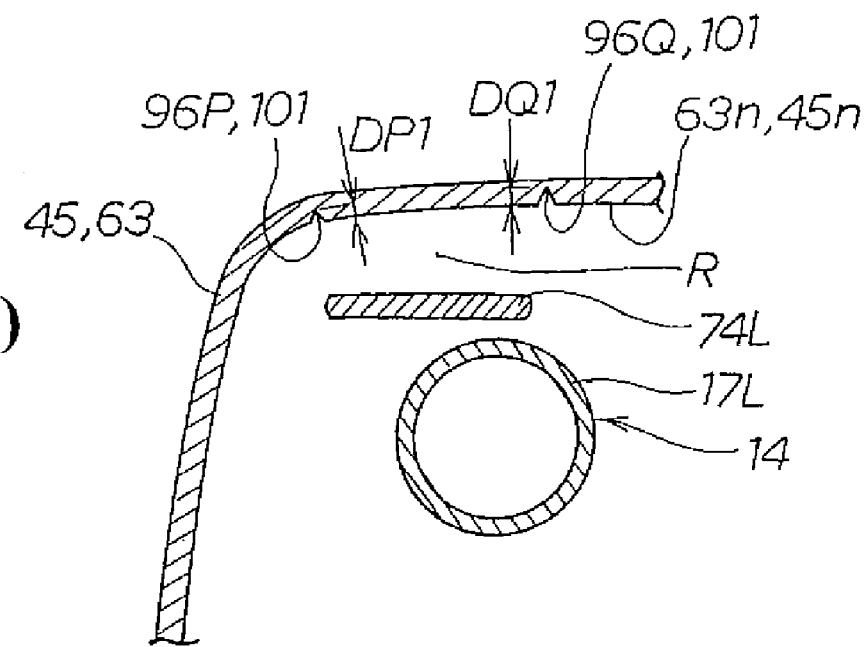
FIGS. 8(a) and 8(b) are cross-sectional views taken along line 8-8 of FIG. 2.
Figure 8B:
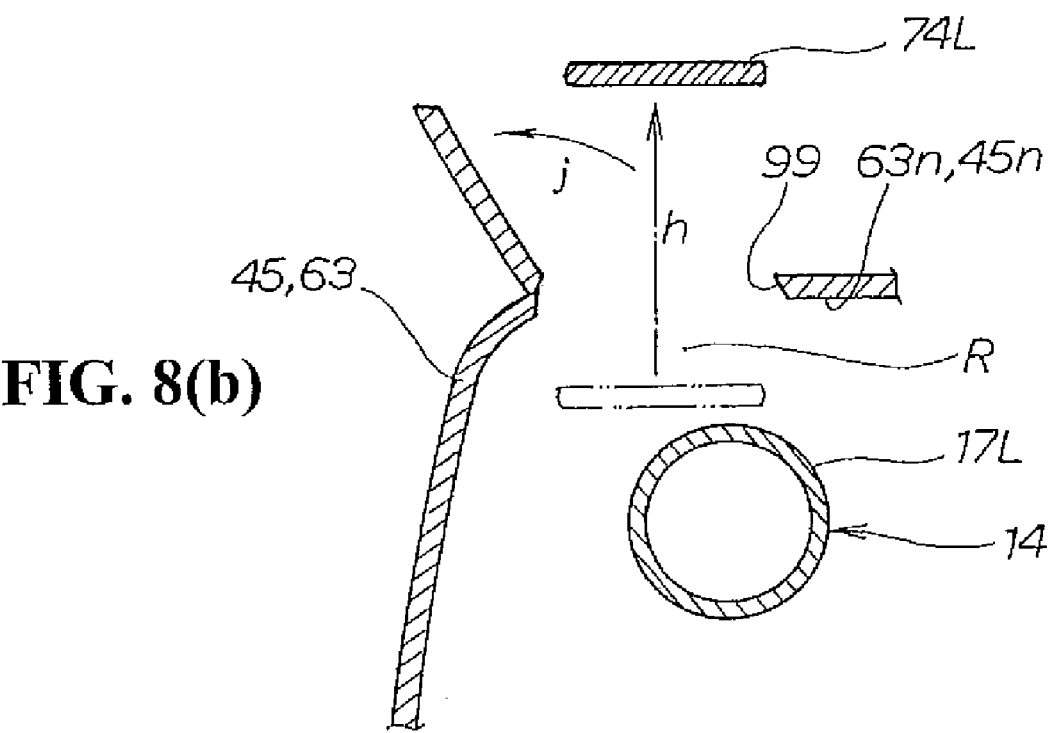

FIGS. 8(a) and 8(b) include cross-sectional views taken along line 8-8 of FIG. 2.

In FIG. 8(a), the bag-mooring member 74L is disposed along a space R defined between the main frame 14 and the cowl 45 and the main frame 14 is covered by the main cowl 63 as a constituent element of the cowl 45.

The bag-mooring member 74L is disposed along the space R defined between the upper frame 17L constituting part of the main frame 14 and the main cowl 63. In addition, an inner surface 63n of the main cowl 63 is formed with two fragile portions 101 along the bag-mooring member 74L from side to side to allow the bag-mooring member 74L to smoothly function during operation of the airbag.

In addition, respective notched portions 96P and 96Q provided for the two left and right fragile portions 101, 101 are formed to have such depths as that DP1<DQ1, where the notch depth of the external notched portion 96P is DP1 and that of the internal notched portion 96Q is DQ1.

During non-operation of the airbag device 77, the bag-mooring member 74L is covered by the cowl 45 (the main cowl 63). Since the bag-mooring member 74L is covered by the front cowl 62, the external appearance of the vehicle can be made satisfactory.

In FIG. 8(*b*), since the internal notch depth DQ1 is greater than the external notch depth DP1, the following occurs upon operation of the airbag device 77. The bag-mooring member 74L is moved in the direction of arrow h to hit and press the inner surface 63*n* of the main cowl 63. This allows the main cowl 63 to cause rupture at the internal notch portion 96Q and to be raised in the direction of arrow j around the external notch portion 96P, thereby allowing the cowl 45 to be formed with an opening 99. The bag-mooring member 74L can pass through the opening 99 and move in the direction of arrow h.

The bag-mooring member 74R disposed on the right side of the vehicle has the same configuration and function as those of the bag-mooring member 74L disposed on the left side; therefore, its explanation is omitted.

The main frame 14 is covered by the main cowl 63 as the cowl 45. The bag-mooring members 74L, 74R are disposed along the space R defined between the main frame 14 and the main cowl 63. Thus, when the airbag device 77 is operated, it is possible to smoothly guide the airbag (see reference numeral 85 in FIG. 7) in the deploying direction thereof.

Further, the inner surface 62*n* of the front cowl 62 as the inner surface 45*n* of the cowl 45 is formed with the fragile portions 101 along the bag-mooring members 74L, 74R. Thus, when the airbag 85 is deployed, the bag-mooring members 74L, 74R hit the corresponding fragile portions 101 formed on the inner surface 62*n* of the cowl 45 to form the opening 99 in the cowl 45 due to the fragile portions 101. In addition, the bag-mooring members 74L, 74R are drawn from the cowl 45 along the fragile portions 101. Thus, the airbag 85 can smoothly be deployed without interrupting the deployment of the airbag 85.

That is to say, even though the left and right bag-mooring members 74L, 74R are covered from above by the cowl 45, the opening 99 can be formed in the cowl 45 at the desired time. Thus, it is possible to smoothly guide the airbag 85 in the deploying direction thereof without impairing the movement of the left and right bag-mooring members 74L, 74R by the cowl 45.

Figure 9A:
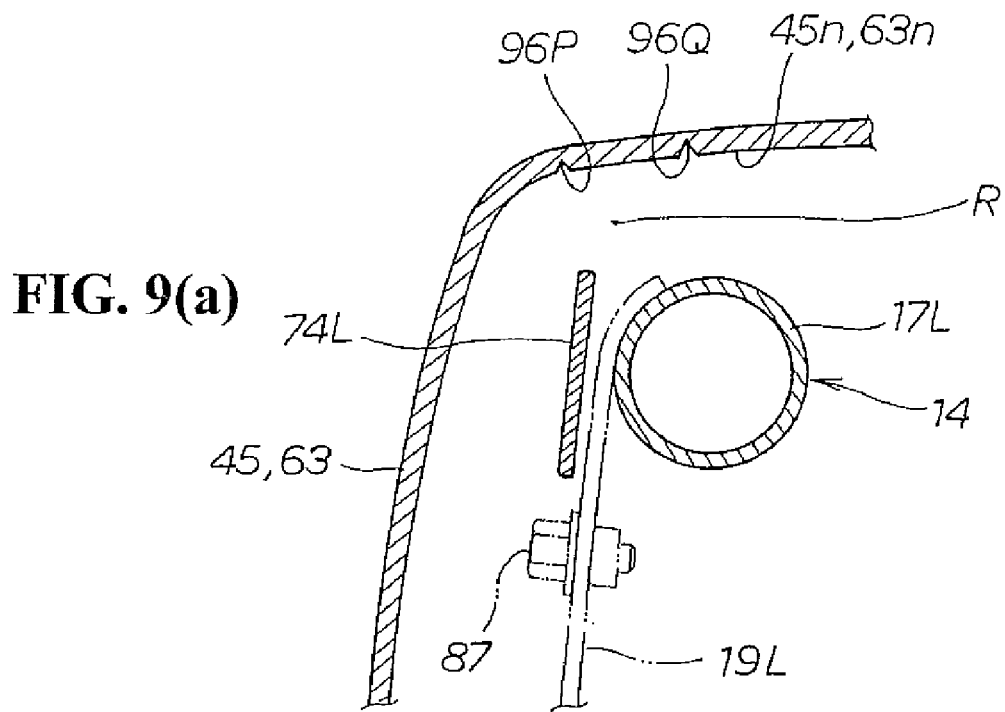
FIGS. 9(a) and 9(b) are cross-sectional views taken along line 9-9 of FIG. 2.
Figure 9B:
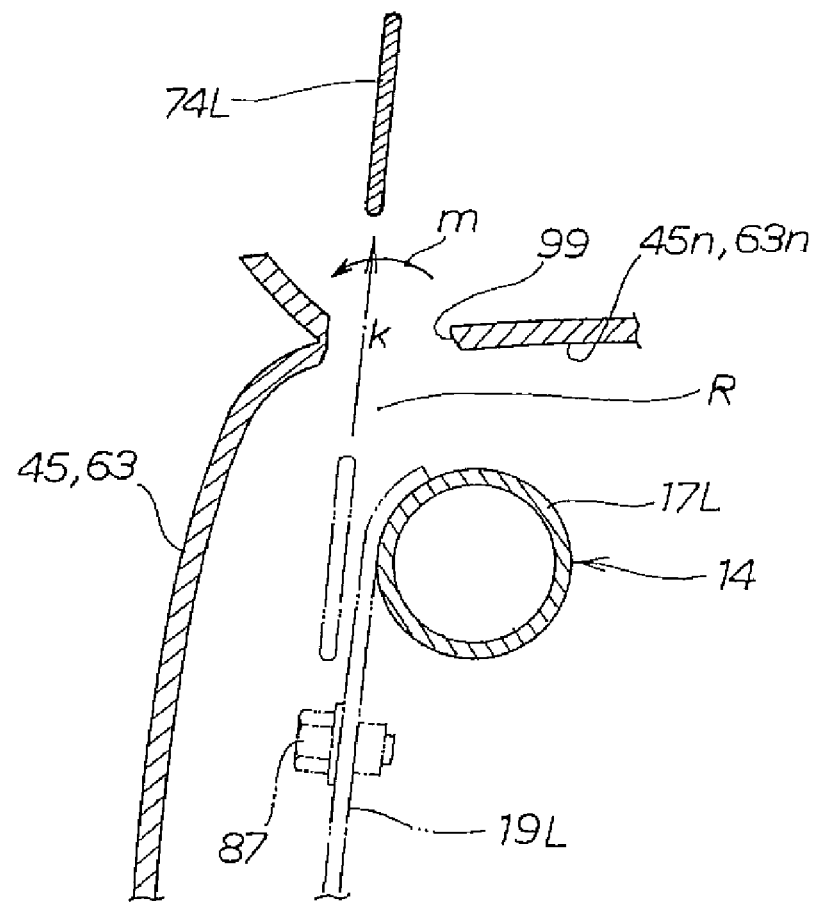

FIGS. 9(*a*) and 9(*b*) include cross-sectional views taken along line 9-9 of FIG. 2. The bag-mooring member 74L is disposed along the space R defined between the main frame 14 and the cowl 45.

In FIG. 9(*a*), during non-operation of the airbag device 77, the bag-mooring member 74L is covered by the cowl 45 (the main cowl 63).

In FIG. 9(*b*), upon operation of the airbag device 77, the bag-mooring member 74L is moved in the direction of arrow k to hit the inner surface 63*n* of the main cowl 63. This allows the main cowl 63 to cause rupture at the internal notched portion 96Q and to be raised in the direction of arrow m around the external notched portion 96P, thereby allowing the cowl 45 to be formed with the opening 99. The bag-mooring member 74L can pass through the opening 99 and move in the direction of arrow k.

A point largely different from FIG. 8 is that the bag-mooring member 74L is disposed in a direction different from that of FIG. 8. The other configurations and function are not largely different from those of FIG. 8.

In addition, the bag-mooring member 74R disposed on the right side of the vehicle has the same configuration and function as those of the bag-mooring member 74L disposed on the left side; therefore, its explanation is omitted.

A description is next given of the operation of the saddle-ride type vehicle described above.

Figure 10A:
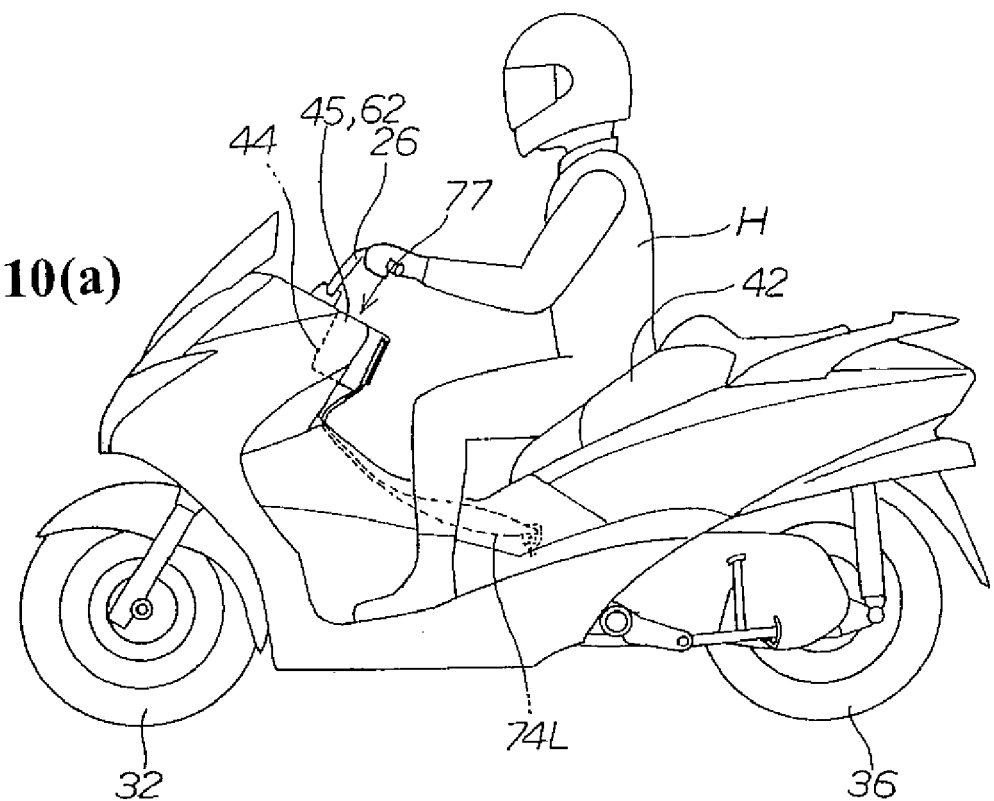
FIGS. 10(a) and 10(b) are operational explanatory views (during normal traveling—the initial time of deploying an airbag) of the airbag device according to the present invention.
Figure 10B:
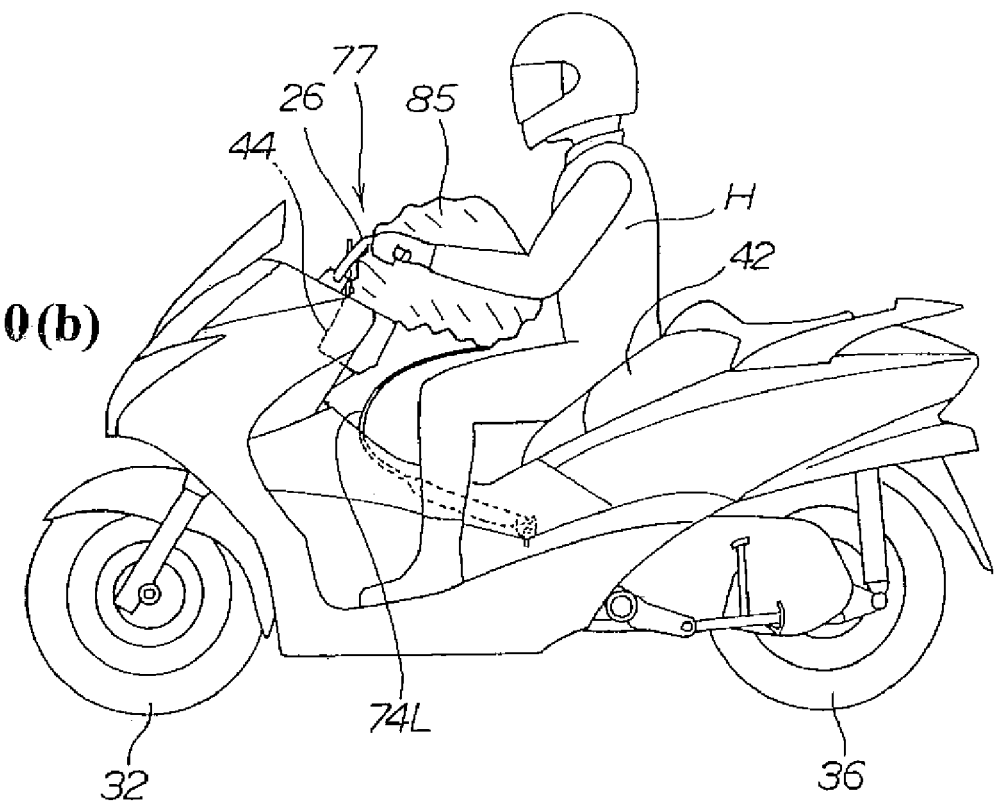

FIGS. 10(*a*) and 10(*b*) include operational explanatory views (during normal traveling—the initial deployment of the airbag) of the airbag device according to the present invention.

In FIG. 10(*a*), during the non-operation of the airbag device 77, the bag-mooring members 74L, 74R are stored inside the front cowl 62 as the cowl 45.

In FIG. 10(*b*), when the airbag device 77 is operated, the airbag 85 is expanded and deployed. Along with this, the bag-mooring members 74L, 74R attached to the airbag 85 are moved outwardly out of the opening 99 formed between the notched portions (reference numerals 96P, 96Q in FIGS. 8 and 9) due to the abutment of the bag-mooring members 74L, 74R.

Figure 11:
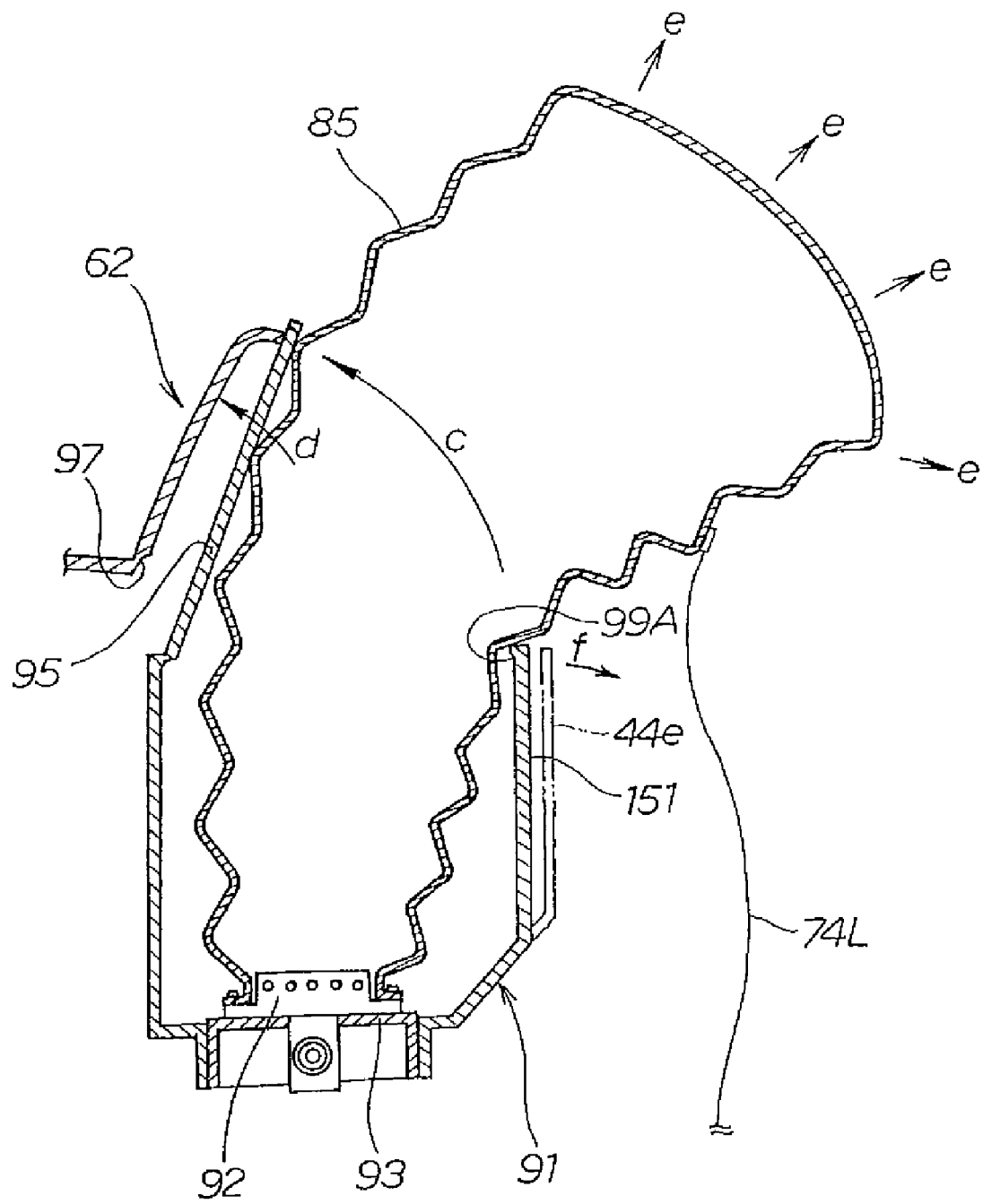
FIG. 11 is a cross-sectional view for assistance in explaining the fact that the upper surface of the airbag module is opened to deploy the airbag.

FIG. 11 is a cross-sectional view for assistance in explaining the fact that the upper surface of the airbag module is opened to deploy the airbag.

When the airbag 85 is expanded and deployed, the expansion of the airbag 85 lifts the lid portion 95 in the direction of arrow c from the notched portion (see reference numeral 96A of FIG. 7) formed on the container portion 91 to form an opening portion 99A. In addition, the expansion of the airbag 85 lifts the rear portion of the front cowl 62 in the direction of arrow d at the notch 97 formed on the front cowl 62. Consequently, the airbag 85 is deployed in the directions of arrows e. Since the notched portion (see reference numeral 96 in FIG. 7) is provided on the container portion 91 and the notch 97 is provided on the front cowl 62, the airbag 85 can smoothly be deployed at the desired time.

At this time, along with the deployment of the airbag 85, the bag-mooring members 74L, 74R folded and stored between the partition wall 151 and the rear surface 44 are extended and additionally the rear surface 44*e* is moved in the direction of arrow f in the figure along with the deployment of the airbag 85.

Figure 12:
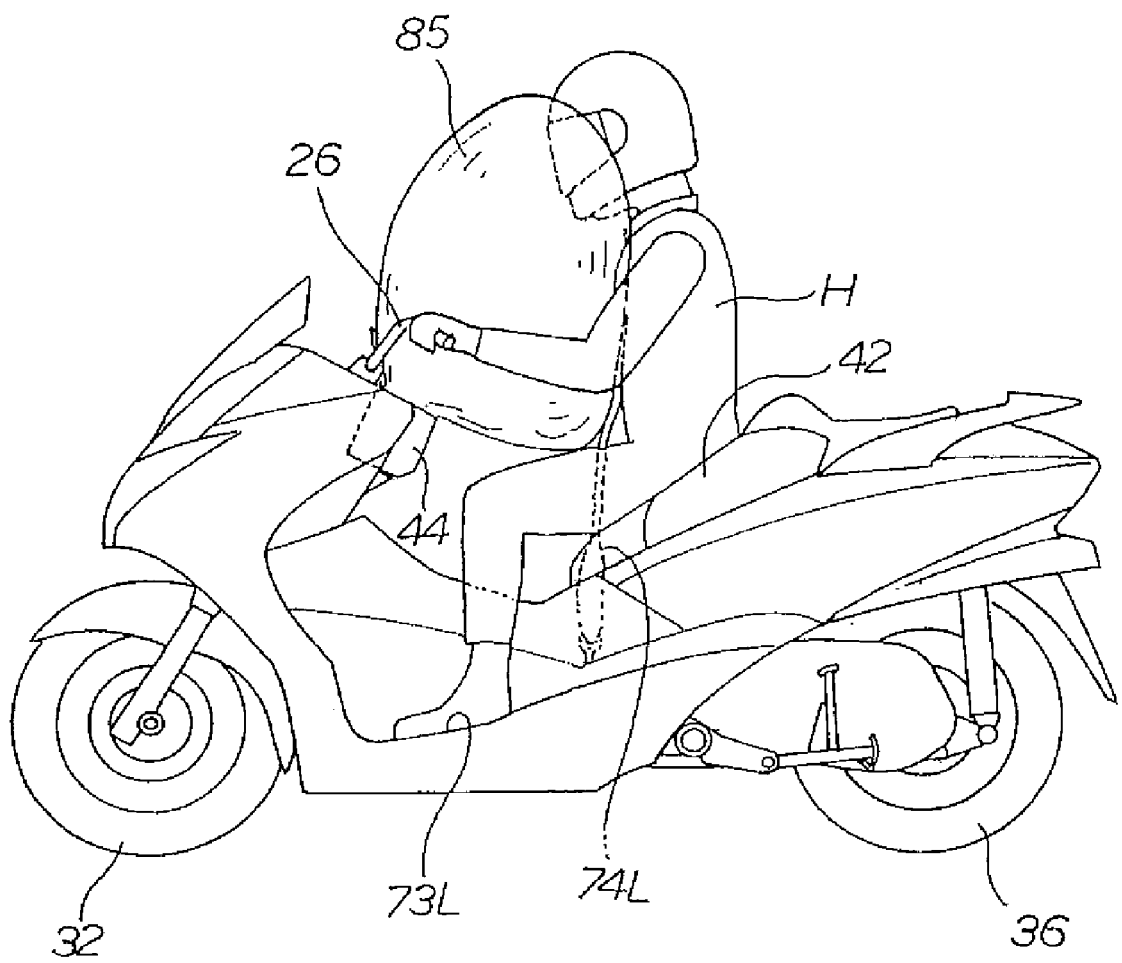
FIG. 12 is an operational explanatory view (at the ending time of deploying the airbag) of the airbag device according to the present invention.

FIG. 12 is an operational explanatory view (at the ending time of the deployment of the airbag) of the airbag device according to the present invention. The airbag 85 is deployed and hits the front of the occupant H. At this time, along with the deployment of the airbag 85, the bag-mooring members 74L, 74R stored in the cowl 45 comes out of the cowl 45 and retains the airbag 85 at a desired position on the front of the occupant H.

With reference to FIGS. 1 and 2, the airbag module 44 is disposed in an unused space 102 to the rear of the head pipe 13 to protrude into the straddle space 43. Therefore, a space can be ensured in the vicinity of the steering handlebar 26. Ensuring the space can make it difficult to affect the layout of members arranged in the vicinity of the steering handlebar 26. Since it is difficult to affect the layout of the members arranged in the vicinity of the steering handlebar 26 in the case of providing the airbag module 44 in the straddle-ride type vehicle 10, the flexibility of arranging the members in the vicinity of the steering handlebar 26 can be enhanced.

With reference to FIG. 5, since the airbag control unit 71 is disposed to at least partially overlap the airbag module 44 if the vehicle is viewed from the rear. Thus, the widthwise-length of the airbag device 77 can be suppressed. This can enhance the flexibility of arranging members.

With reference to FIGS. 8 to 12, the pair of left and right bag-mooring members 74L, 74R are disposed along the main frame 14. When the airbag 85 is expanded and deployed, of the bag-mooring members 74L, 74R, the front ends 76L, 76R of the bag-mooring members 74L, 74R which are connecting portions with the air bag 85 are first lifted. Along with the expansion and deployment of the airbag 85, the bag-mooring members 74L, 74R are lifted from the front ends 76L, 76R of the bag-mooring members 74L, 74R toward the rear ends 75L, 75R. As described above, since the bag-mooring members 74L, 74R are disposed along the main frame 14, it is possible for the bag-mooring members 74L, 74R to smoothly guide the airbag 85 in the deploying direction thereof.

In addition, the present embodiment describes the scooter-type motorcycle as the straddle-ride type vehicle. However, the three-wheeled vehicle or the like may be applicable.

According to an embodiment of the present invention, the airbag module may be allowed to be disposed rearward of, forward of or upward of the steering handlebar.

According to an embodiment of the present invention, the rear surface of the airbag module may be allowed to be disposed not to protrude from the external surface of the cowl.

According to an embodiment of the present invention, the widthwise-length of the airbag module can be set at any length.

According to an embodiment of the present invention, the left and right end edges provided on the airbag module rear surface may not be chamfered.

According to an embodiment of the present invention, the lower end edge provided on the rear surface of the airbag module may not be chamfered.

The present invention is suitable for scooter-type motorcycles.

According to an embodiment of the present invention, the airbag control unit may be allowed to be disposed forward head pipe if the vehicle is viewed from the side.

According to an embodiment of the present invention, it is reasonable to omit the space permitting the airbag control unit to move rearward of the airbag control unit.

According to an embodiment of the present invention, it is reasonable to dispose the airbag module and the airbag control unit not to be offset in the height-direction.

According to an embodiment of the present invention, it is reasonable not to dispose the central axis of the airbag module and the central axis of the airbag control unit so as to extend along the axial direction of the head pipe if the vehicle is viewed from the side.

According to an embodiment of the present invention, it is reasonable to dispose both the key cylinder and the airbag control unit on one side of the sides of the head pipe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A straddle-ride type vehicle comprising:
    a head pipe is mounted at a leading end of a body frame to turnably support a steering handlebar;
    a seat is mounted rearward of the head pipe and adapted to allow an occupant of the vehicle to sit thereon;
    a straddle space is defined between the steering handlebar and the seat; and
    an airbag module is mounted forward of the seat for storing an airbag therein;
    wherein the airbag module is disposed rearward of the head pipe to partially face the straddle space and at least a portion of the airbag module is disposed within a vertical height of the head pipe as viewed from the side,
    wherein the body frame includes a pair of left and right upper frames extending downwardly and rearwardly from an upper portion of the head pipe and a pair of left and right lower frames extending downwardly and rearwardly from a lower portion of the head pipe; and
    wherein both left and right lateral surfaces of the airbag module with respect to an anteroposterior center thereof are disposed externally of a left-right external width of the upper frame and internally of a left-right external width of the lower frame.

2. The straddle-ride type vehicle according to claim 1, further comprising:
    an airbag control unit for controlling deployment of the airbag,
    wherein the airbag control unit is disposed to overlap the head pipe if the vehicle is viewed from left or right sides of the vehicle the head pipe, and to at least partially overlap the airbag module if the vehicle is viewed from the a rear of the vehicle.

3. The straddle-ride type vehicle according to claim 1, further comprising:
    an airbag control unit for controlling deployment of the airbag,
    wherein the airbag control unit is disposed vehicle-widthwise laterally of the head pipe, and to at least partially overlap the airbag module if the vehicle is viewed from a rear of the vehicle, and not to overlap the airbag module if the vehicle is viewed from left or right sides of the vehicle.

4. The straddle-ride type vehicle according to claim 1, wherein the airbag module is disposed below the steering handlebar.

5. The straddle-ride type vehicle according to claim 4, wherein a front portion of the body frame is provided with a cowl for covering a vehicle body and a rear surface of the airbag module protrudes outwardly from an outer surface of the cowl.

6. The straddle-ride type vehicle according to claim 5, wherein the airbag module is formed boxlike and left and right end edges provided on the rear surface of the airbag module are chamfered.

7. The straddle-ride type vehicle according to claim 5, wherein the airbag module is formed boxlike and a lower end edge provided on the rear surface of the airbag module are chamfered.

8. The saddle-ride vehicle according to claim 1, further comprising:
    a pair of left and right bag-mooring members for retaining the airbag at a position facing the occupant upon expansion and deployment of the airbag,
    wherein the left and right bag-mooring members are arranged along and above the main frame, and are arranged along a space defined between the main frame and a cowl of the vehicle.

9. A straddle-ride type vehicle comprising:
    a head pipe turnably supporting a steering handlebar;
    an airbag module storing an airbag therein; and
    an airbag control unit for controlling deployment of the airbag;
    wherein the airbag module is disposed rearward of the head pipe, and
    the airbag control unit is offset in a lateral direction of the vehicle relative to the head pipe, and is disposed to at least partially overlap the airbag module if the vehicle is viewed from a rear of the vehicle, and to not overlap the airbag module if the vehicle is viewed from left or right sides of the vehicle.

10. The straddle-ride type vehicle according to claim 9, wherein the airbag module and the airbag control unit are arranged to be offset in a height-direction.

11. The straddle-ride type vehicle according to claim 9, wherein a central axis of the airbag module and a central axis of the airbag control unit are arranged along an axial direction of the head pipe if the vehicle is viewed from the side.

12. The straddle-ride type vehicle according to claim 9, wherein a key cylinder used to turn on or off power supply to the vehicle is disposed on one side of the head pipe and the airbag control unit is disposed on the other side thereof with the head pipe put therebetween.

13. The straddle-ride type vehicle according to claim 9, wherein the head pipe is slantwise arranged so that a lower end is located forward of an upper end, and
    the airbag control unit is disposed rearward of a front end of the lower end portion of the head pipe if the vehicle is viewed from the side.

14. The straddle-ride type vehicle according to claim 13, wherein a space is provided rearward of the airbag control unit to permit movement of the airbag control unit.

15. The straddle-ride type vehicle according to claim 13, wherein the airbag module and the airbag control unit are arranged to be offset in a height-direction.

16. The straddle-ride type vehicle according to claim 13, wherein a central axis of the airbag module and a central axis of the airbag control unit are arranged along an axial direction of the head pipe if the vehicle is viewed from the side.

17. The straddle-ride type vehicle according to claim 9, wherein a space is provided rearward of the airbag control unit to permit movement of the airbag control unit.

18. The straddle-ride type vehicle according to claim 17, wherein the airbag module and the airbag control unit are arranged to be offset in a height-direction.

* * * * *